Patented Nov. 15, 1927.

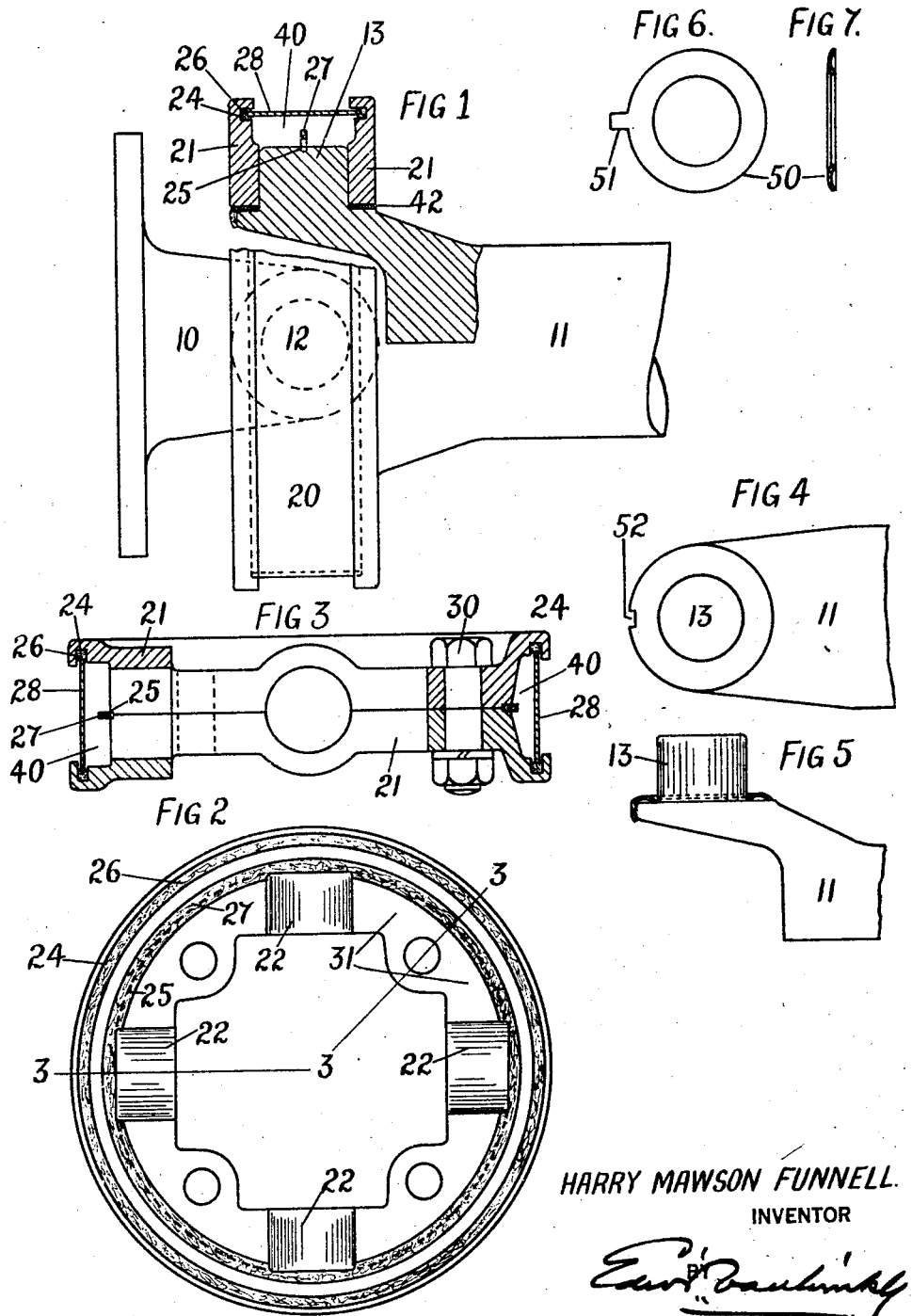

1,649,460

UNITED STATES PATENT OFFICE.

HARRY MAWSON FUNNELL, OF NEW MARKET, NEW JERSEY.

UNIVERSAL JOINT.

Application filed January 21, 1926. Serial No. 82,833.

This invention relates to universal joints, and more particularly to joints of the character wherein the trunnions are mounted in and connected by a member in the shape of a ring having a chamber or chambers for lubricant therein. It is the general purpose and object of the invention to provide a construction of universal joint of this character wherein the trunnions may be efficiently lubricated, also to provide a joint which is cheap of manufacture and which is easily assembled and disassembled.

The foregoing and other features of my invention will now be described in connection with the accompanying drawings forming part of this specification in which I have represented my universal joint in its preferred form after which I shall point out more particularly in the claims those features which I believe to be new and of my own invention.

In the drawings:

Figure 1— is a side elevation, in part section of my universal joint.

Figure 2— is an inside view of torque ring with packing rings in place.

Figure 3— is a section of the complete torque ring along the line 3—3—3, Figure 2.

Figures 4 and 5 are details of trunnion arms employed.

Figures 6 and 7 are details of thrust and sealing washers.

In the construction illustrated 10 and 11 are driving or driven members each provided with trunnions embraced in a torque ring 20 which comprises all the features of a standard ring type universal joint. In the construction shown the member 10 is a standard flanged yoke provided with a through cross pin 12 the ends of which serve as the driving trunnions while the member 11 is a bifurcated yoke supporting two trunnions 13 which in the construction shown are the driven members. These four trunnions are embraced in a torque ring 20 which in this case comprises two circular members 21 each provided with four semi-circular bearing surfaces 22 extending radially from the inside of the ring forming the bearings for the trunnions of the driving and driven members. The periphery of each ring member 21 is extended beyond the ends of the trunnions and is provided with circular grooves 24 and 25 to accommodate rings of packing material 26 and 27 respectively.

A ring or piece of tubing 28 is provided to interfit in the packing grooves 24 and be sealed with the packing 26 when the members 21 are bolted together by bolts 30. It will be observed that between the bearings 22 there is provided a large surface 31 in each of the two halves of torque ring, and that when the ring is assembled these two faces are solidly clamped together by the bolts 30. It will also be apparent that when these surfaces come in contact with each other, that this construction provides a perfect seal through the rings of packing and that an oil tight lubricant containing chamber 40 is thereby provided outside of the torque ring.

Furthermore, while the joint is in operation with this construction the lubricant will not be lost due to pressure created by centrifugal force and that the lubricant is drained away from the possible leakage point, which is the junction of the thrust shoulder 42 and complete ring 20.

To prevent any lubricant from being lost due to seepage at this leakage point while the joint is at rest, I provide a concavo-convex washer 50 provided with a lip 51 adapted to enter a slot 52 provided in the thrust shoulder 42 which prevents the washer 50 from turning. This washer presents its convex surface to the ring and serves not only as a thrust washer but as a means for preventing the loss of the lubricant. It will be observed that with this washer the sharp edges cannot turn against the surfaces on which they rest and that the other side of the washer presents a narrow contact which is continually seating itself due to the spring action of the curved washer and the partial rotation of the thrust surfaces.

It will be observed that this form of construction readily lends itself to cheap production at the same time accuracy of manufacture, because it is a single fit assembly, in that the diameter of the bearings and the diameter of the trunnions are the only parts that must be made to fit. When the two halves of the ring sections are bolted together the packings give until the inside faces 31 of the ring sections are solidly together and thereby form a seal for the lubricant containing chamber 40.

I wish it distinctly understood that my universal joint herewith described and illustrated is in the form in which I desire to construct it, but that changes or variations may be made as may be convenient or desirable without departing from the salient features of my invention and I, therefore, intend the following claims to cover such modifications as naturally fall within the lines of invention.

I claim:—

1. In a universal joint of the ring type a driving and driven member in combination with a torque ring comprising two sections, each provided with four radial semi-circular bearings and two annular packing grooves, a ring adapted to interfit in the outer of the annular grooves, rings of packing in the inner and outer grooves.

2. The device of claim 1 with the addition that the annular packing grooves are outside the ends of the bearings.

3. The device of claim 1 with the addition of means for securing the sections together.

4. In a universal joint of the ring type a driving and driven member in combination with a torque ring comprising two sections, each provided with four radial semi-circular bearings and two annular packing grooves, a ring adapted to interfit in the outer of the annular grooves forming an annular lubricant containing chamber means to bolt the sections together, the said bolts passing through the sections without mutilating the walls of the lubricant containing chamber.

5. The device of claim 4 with the addition that the lubricant containing chamber is outside the bearings.

In testimony whereof I affix my signature.

HARRY MAWSON FUNNELL.